United States Patent [19]
Whisenand et al.

[11] Patent Number: 4,480,464
[45] Date of Patent: Nov. 6, 1984

[54] GENERAL PURPOSE HYDRAULIC TEST STATION

[75] Inventors: Neal Whisenand, Palmdale; Richard Tauber, Northridge, both of Calif.

[73] Assignee: HR Textron Inc., Valencia, Calif.

[21] Appl. No.: 470,361

[22] Filed: Feb. 28, 1983

[51] Int. Cl.³ .............................................. G01M 3/26
[52] U.S. Cl. .............................................. 73/40
[58] Field of Search .............................................. 73/40

[56] References Cited

U.S. PATENT DOCUMENTS 3,827,283 8/1974 Lerner et al. .............................. 73/40

*Primary Examiner*—Gerald Goldberg
*Assistant Examiner*—Joseph W. Roskos
*Attorney, Agent, or Firm*—Nilsson, Robbins, Dalgarn, Berliner, Carson & Wurst

[57] ABSTRACT

A hydraulic test station useful for testing various types of hydraulic apparatus, both at the time of its manufacture and in the field. The test station includes a main console, a roll-up module on which the apparatus to be tested is mounted and an electronic system for controlling the station. The main console includes a plurality of ports. Each of the individual ports may be independently selected for purposes of testing a particular hydraulic apparatus and the specific port may be independently designated as a pressure port or a return port. A manifold is associated with each of the ports and is controllable to select those pressures and flow rates required for performing the desired test or tests on the connected apparatus.

23 Claims, 6 Drawing Figures

GENERAL PURPOSE HYDRAULIC TEST STATION

BACKGROUND OF THE INVENTION

1. Field of the Invention

This invention relates generally to hydraulic apparatus and more specifically to a system for testing hydraulic devices of various types.

2. Prior Art

It has been common practice in the art to test hydraulic components, sub-systems and systems (hydraulic devices) subsequent to their assembly to ascertain whether the hydraulic device is operating in accordance with the specifications set forth for it. For example, it is typical to connect a hydraulic actuator to a test stand and determine its frequency response, external and internal leakage, proof pressure, ram travel and velocity, damping, hysteresis and the like. In such prior art test stands, the individual ports to which the hydraulic apparatus under test is connected are dedicated ports. That is, each of the ports functions to provide a source of hydraulic fluid under pressure or its return to which the hydraulic device under test may be connected. It is never possible, without substantial rerouting of the hydraulic plumbing, to change a particular port from a pressure port to a return port or vice versa. As a result, each hydraulic test stand has been severely limited as to the hydraulic devices which could be tested on that particular test stand.

SUMMARY OF THE INVENTION

A general purpose hydraulic test station which includes a housing having a source of hydraulic fluid under pressure and a hydraulic return and defining a plurality of hydraulic ports. A manifold means is connected to at least one of the hydraulic ports and includes valve means which is connected to the hydraulic source and the return and also to the selected port. Control means is provided for energizing the valve means to selectively connect either the source of hydraulic fluid under pressure or the return to the selected port.

DETAILED DESCRIPTION

A hydraulic test station constructed in accordance with the principals of the present invention is provided to allow operators thereof to select a plurality of types of tests which can be performed upon a variety of hydraulic components, sub-systems and systems (hydraulic devices) in accordance with a predetermined testing program. The test station may be used by an original equipment manufacturer at the time of assembly of the hydraulic components, assemblies or subassemblies. Additionally, the test station can be utilized in the field for testing hydraulic devices. Such field testing is required to determine whether the device should be repaired or whether the device is serviceable after being repaired. Field testing in the prior art has not been generally satisfactory because of the number of dedicated test stands required. As a result, many hydraulic devices were removed and returned to a central depot for such testing.

Test equipment which has such a plurality of tests, any one of which may be selected, is relatively expensive to manufacture and to maintain. It is therefore necessary to provide as much versatility to such a test station as is possible. As a result, the test station, in accordance with the present invention, includes a plurality of hydraulic ports, each of which is connectable to a wide variety of hydraulic devices to be tested, and each of which can be at will designated a hydraulic pressure supply port or a return port depending upon the device undertest and the sequence of tests being performed.

Figure 1:
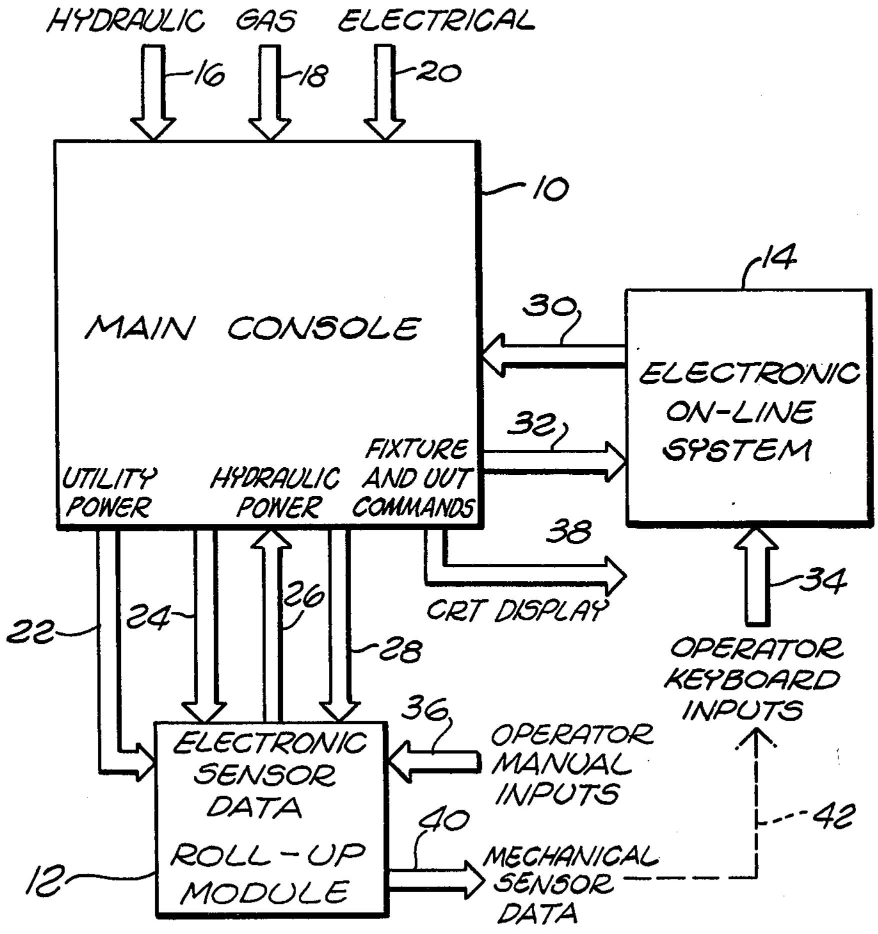
FIG. 1 is a schematic diagram illustrative of the general purpose hydraulic test station constructed in accordance with the present invention.

As is shown in FIG. 1, a test station constructed in accordance with the present invention includes a main console 10 a roll-up module 12 and an electronic on-line system 14. The main console contains the primary electrical and hydraulic components which are used to apply the hydraulic and electrical signals to the hydraulic device under test. As is illustrated, hydraulic pressure and return 16 gas 18 and electrical 20 may be connected to the main console. Alternatively, those skilled in the art will understand that the hydraulic, gas and electrical supplies may be self-contained within the main console.

The roll-up module 12 includes means for receiving the hydraulic device which is to be tested. Thus the roll-up module is dedicated to a particular hydraulic device such as a servovalve or an actuator. Through the utilization of such a roll-up module, the expense of dedicated test stands for specific hydraulic devices is minimized. The roll-up module, once the unit under test is attached thereto, is positioned adjacent the main console and is then interconnected herewith as by the cables 22 through 28 to provide electrical power and hydraulic power from the main console to the unit under test and at the same time for electronic data generated during the test by the device or unit under test to be transmitted to the main console.

The electronic on-line system 14 includes the various control and data recording devices to instruct the main console, responsive to inputs from the operator conducting the test, as to the type of tests and the manner in which they are to be conducted. The electronic on-line system 14 would thus include such things as a microprocessor, instrumentation packages and recording apparatus as well known to those skilled in the art. The electronic on-line system and the main console are interconnected by the cables 30 and 32 to provide the flow of data therebetween.

Additional operator inputs may be provided to the electronic on-line system as indicated by the cable 34 as well as to the roll-up module 12 as indicated by the cable 36. Additional displays may be provided for assistance in utilizing the main console as is indicated by the cable 38 which may be connected to an appropriate video display system or the like. Additional mechanical or electronic output sensor data may be provided from the roll-up module 12 as is indicated by the cable 40 for interconnection to other portions of the test station as inputs for other uses and the like as is generally indicated by the dashed line 42.

Figure 2:
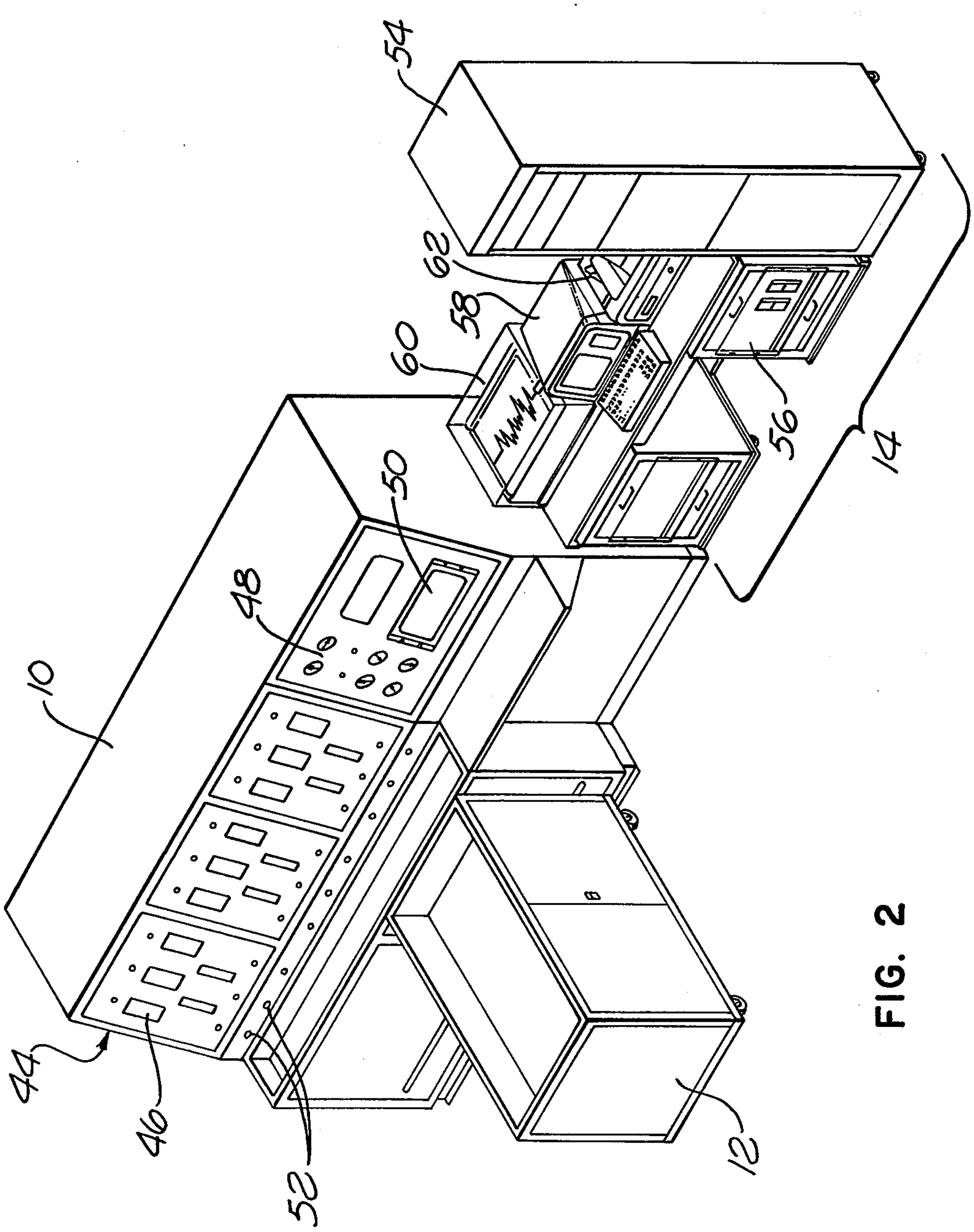
FIG. 2 is a perspective view illustrative of one form which a test station constructed in accordance with the principals of the invention may take.

Those skilled in the art will recognize that a general purpose hydraulic test station as generally illustrated in the block diagram of FIG. 1 may take various forms. For purposes of illustration and clarity of understanding of the present invention, one such form is schematically shown in FIG. 2. As is therein illustrated, the main console 10 has the roll-up module 12 positioned adjacent thereto. The electronic on-line system 14 is positioned adjacent to the main console 10 for purposes of controlling the tests being performed and recording the resulting data.

As is generally shown in FIG. 2 the main console 10 includes a front panel shown generally at 44 and may include various selector switches, panels, or the like as shown generally at 46, gauges as shown generally at 48, a video readout as shown generally at 50, as well as a plurality of hydraulic ports shown generally at 52.

The roll-up module 12 as can be seen, is a cart type structure which includes internally thereof appropriate hydraulic plumbing and the like. The cart is mounted on wheels so that it can be rolled up adjacent the main console 10 when a test is to be performed and then removed when the test is completed. This can be accomplished simply by interconnecting appropriate hoses between the cart and one or more of the ports 52 as well as an appropriated electrical cable for transmission of signals between the device under test and the console.

The electronic on-line system 14 includes an electronic control console 54 which may include appropriate instrumentation control panels with electronic interfaces and the like. In addition thereto, a data processing unit 56 is interconnected with an appropriate terminal 58 for purposes of an interface with the operator to permit selection of the desired tests for the particular device under test and the initiation thereof. Appropriate recording devices such as a plotter 60 and a printer 62 are interconnected with the data processing unit 56 and the control console 54 to record the data which is being generated during the time the test is being conducted.

Figure 3:
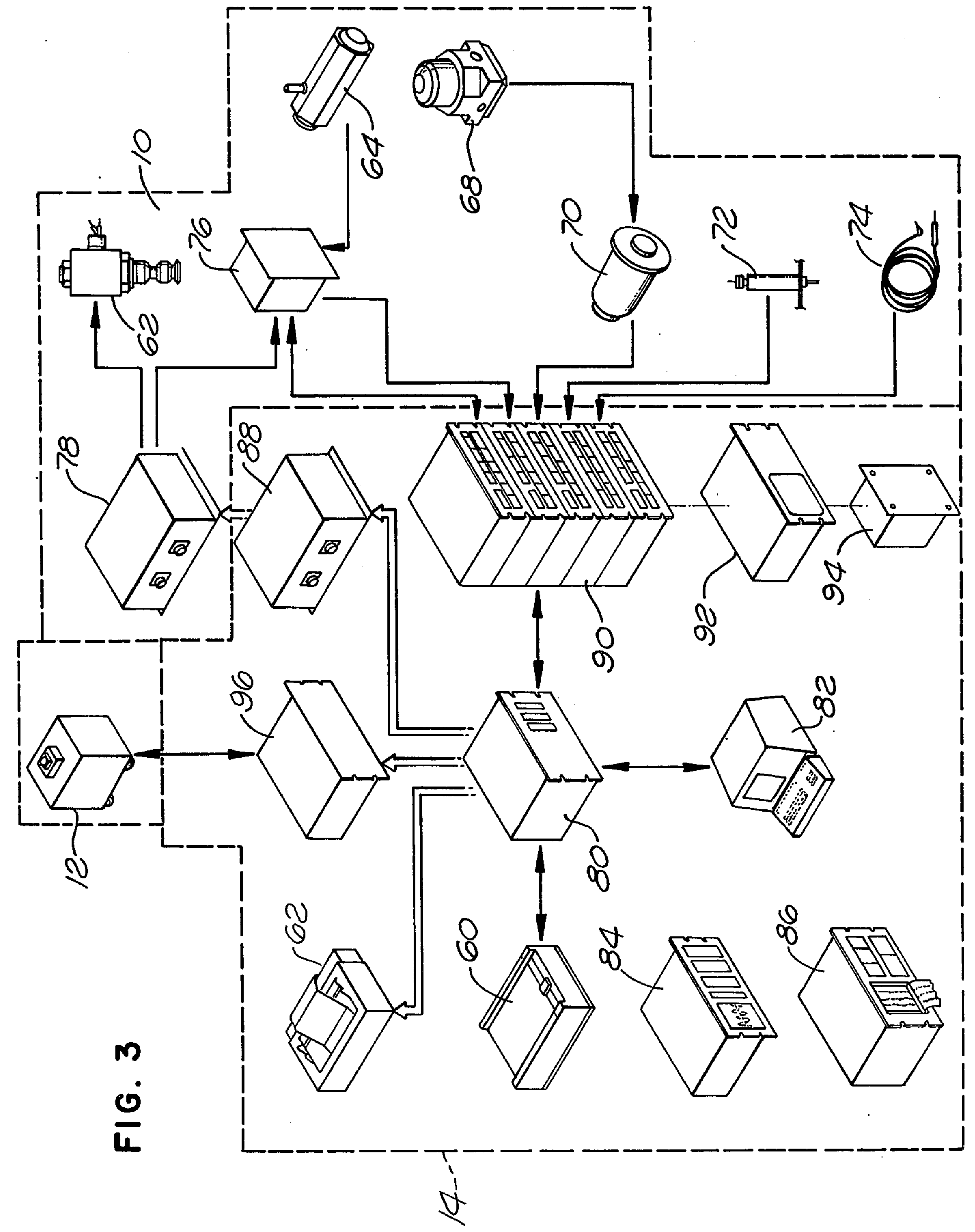
FIG. 3 is a more detailed block/schematic diagram illustrative generally of the functions performed by the general purpose hydraulic test station constructed in accordance with the present invention.

The test station is illustrated in a more functional block diagram format in FIG. 3 to which reference is hereby made. As is illustrated in FIG. 3 the main console 10 has positioned therein various components for controlling or measuring temperature, hydraulic pressure, hydraulic flow, or the like. Such devices may for example include solenoid valves 61, flow meters 64, pressure reducing valves 68, pressure transducers 70, flow transducers 72 and temperature probes 74. A hydraulic selector panel 76 is included to permit appropriate selection of particular components and functions as may be required.

An appropriate decoder/driver unit 78 is utilized to receive signals from the on-line electronic system 14 to energize various of the hydraulic components above referred to.

The on-line electronic system includes the data processing unit 80 which has an appropriate input terminal 82 connected thereto. Appropriate output devices such as the plotter 60 and the line printer 62 are interconnected with the data processing unit 80. In addition thereto, other types of recording devices such as an oscilliscope 84 or a strip chart recorder 86 may also be included and connected with the data processing unit if such is desired. An interface unit 88 may be connected between the data processor 80 and the decoder/driver unit 78 in the main console so that signals from the data processor may be transmitted over the appropriate busses to accomplish the desired device test and data retrieval. An instrumentation and control interface 90 is provided and is interconnected between the data processing unit 80 and the main console 10 to provide signals to the hydraulic selector panel 76 and to receive information from the various hydraulic components in accordance with a particular test for a particular device as has been selected by the operator. Appropriate read out devices such as a video read out and CRT units are provided as shown at 92 and 94.

Interconnected with the data processor is an electronic interface 96 for connection to the roll-up module 12 so that appropriate signals may be applied to the device under test and data received therefrom and applied to the data processing unit 80 as the test is being conducted.

Figure 4:
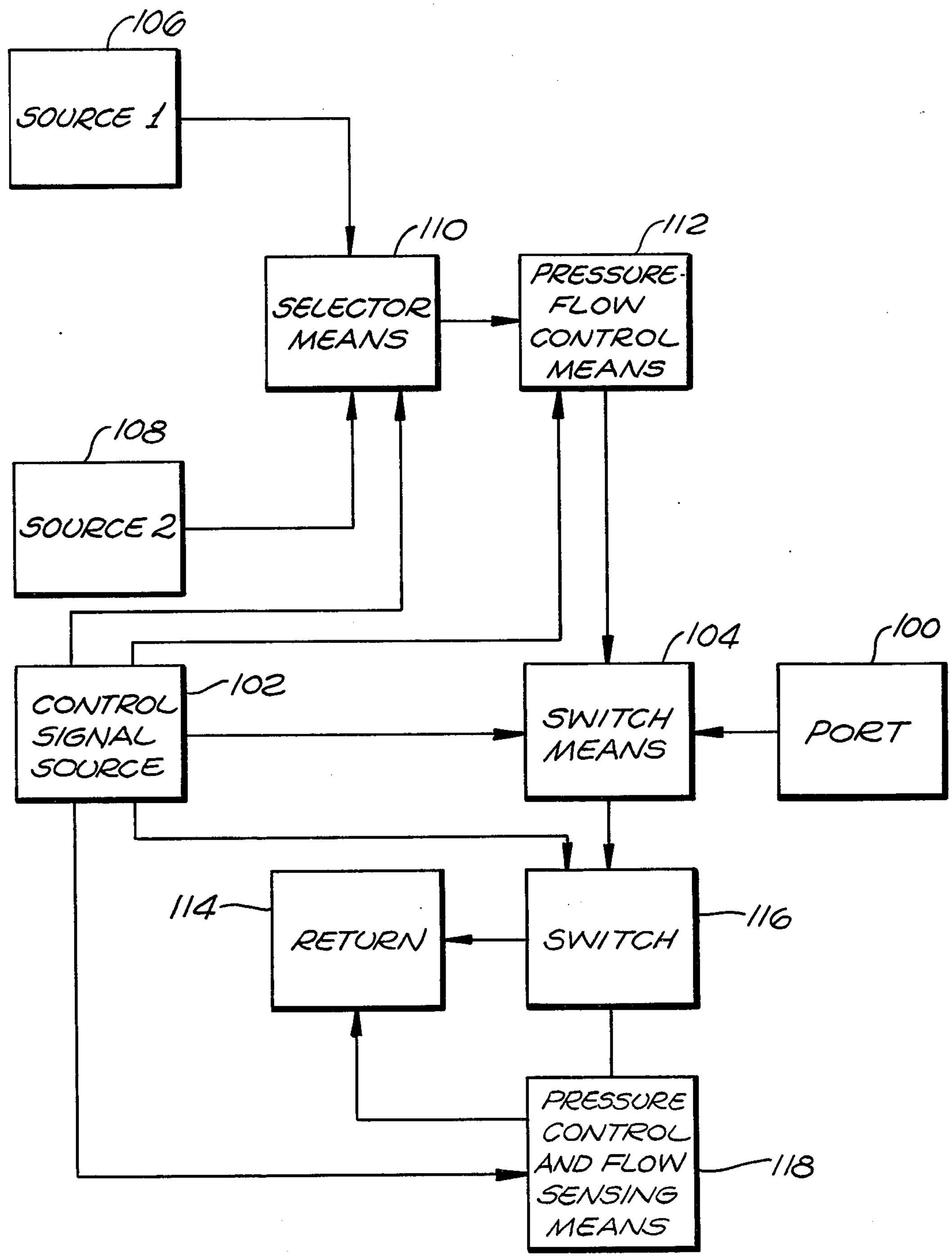
FIG. 4 is a block diagram illustrating generally the functions of the manifold connected to the ports of the hydraulic test station.

As has above been pointed out, one of the important features of the present invention is the ability to select any one of the hydraulic ports 52 for purposes of conducting a particular test and in addition thereto to designate a particular hydraulic port as either a pressure port or a return port depending upon the particular device under test and the test to be performed thereon. This flexibility is provided by utilizing a manifold with each of the hydraulic ports. Each of the manifolds is independently controllable to connect pressure or return as well as additional functions to the particular port of concern. FIG. 4 is a schematic block diagram showing the general features of such a manifold.

As is illustrated in FIG. 4 a port 100 which may be a predetermined one of the ports 52 in the main console 10 (FIG. 2) may be caused to function as a hydraulic pressure source or a hydraulic return as desired depending upon the particular application. A control signal source 102 provides control signals in response to appropriate commands to operate various of the components in the system as illustrated by the various lines emanating therefrom. Switch means 104 is selectively actuated by the signal source 102 to connect hydraulic pressure or return to the port 100. The hydraulic pressure may include one or more sources of hydraulic fluid under pressure as shown at 106 and 108. Source 1 and source 2 are individually connected to a selector means 110 which, responsive to a signal from source 102, interconnects either source 1 or source 2 to a pressure/flow control means 112. The pressure/flow control means 112 functions responsive to control signals from source 102 to regulate the amount of pressure which will be applied to the device under test connected to the port 100, or alternatively or in addition, also may control the rate of flow of the hydraulic fluid to the device under test. If the port 100 is to be selected as a source of hydraulic fluid under pressure responsive to signals from the source 102 then the switch 104 functions to connect the output of the pressure/flow control means 112 to the port 100 thus supplying the desired hydraulic fluid at the correct pressure and flow to the device under test connected to port 100.

Alternatively the port 100 may be connected to hydraulic return 114 by the switch means 104. Certain test procedures require measurement of the hydraulic fluid flow rate from the return of the device under test. Additionally the device under test must properly function with the return thereof subjected to certain hydraulic pressures or ranges of pressure. That is the pressure and flow rate from the return of the device under test are an important part of the testing procedures. Under these circumstances an additional switch means 116 may be actuated responsive to a signal from the source 102 to interconnect a variable pressure control and flow sensing means 118 between the switch 104 and the return 114. Under these circumstances the device under test will be subjected to appropriate return pressure and flow testing to ascertain whether it is operating in accordance with appropriate specifications.

Figure 5A:
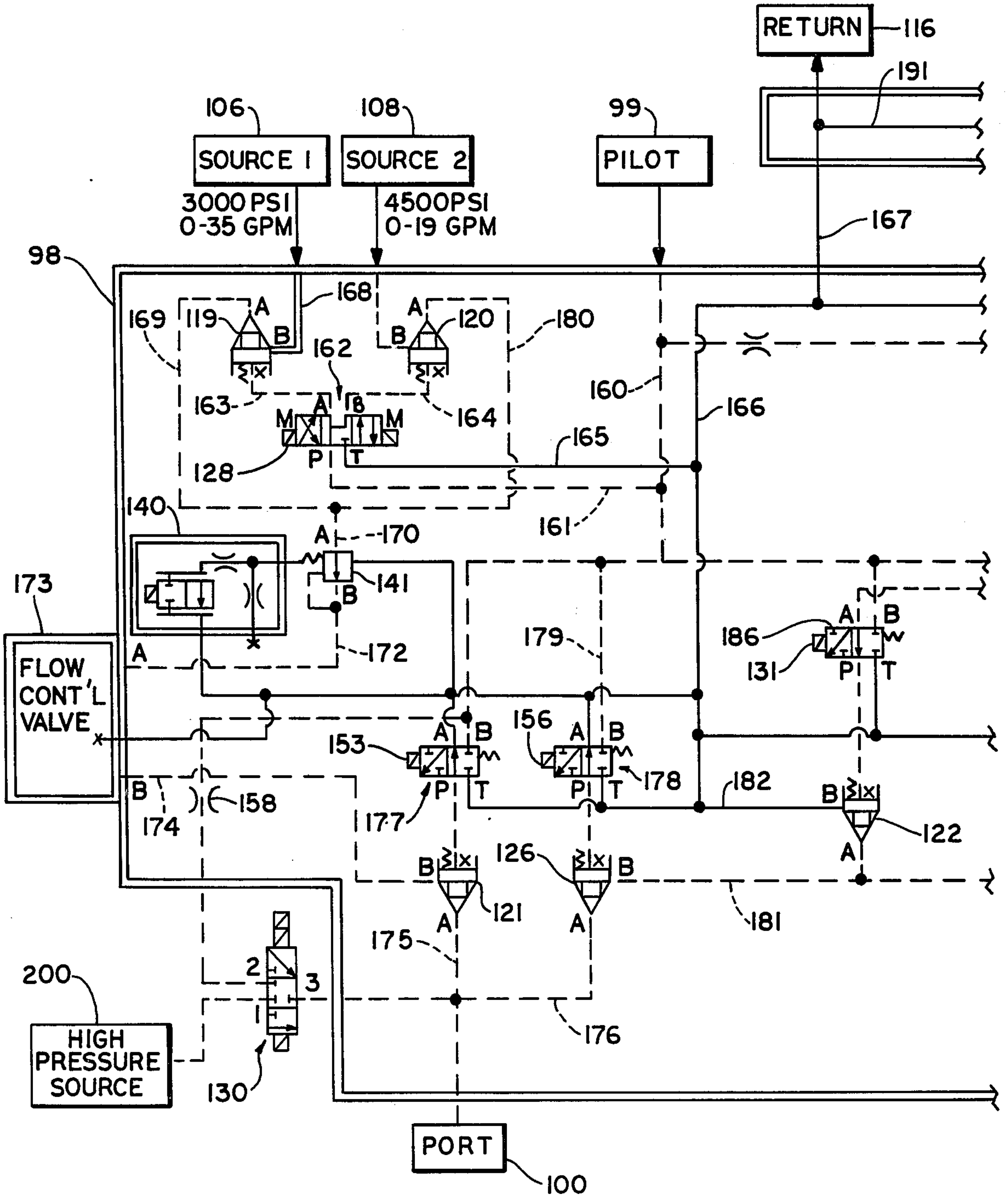
FIGS. 5*a* and 5*b* are a detailed schematic diagram illustrating the manifold which is used to control the function of each of the hydraulic ports available in the main console of the general purpose hydraulic test station constructed in accordance with the principals of the present invention.
Figure 5B:
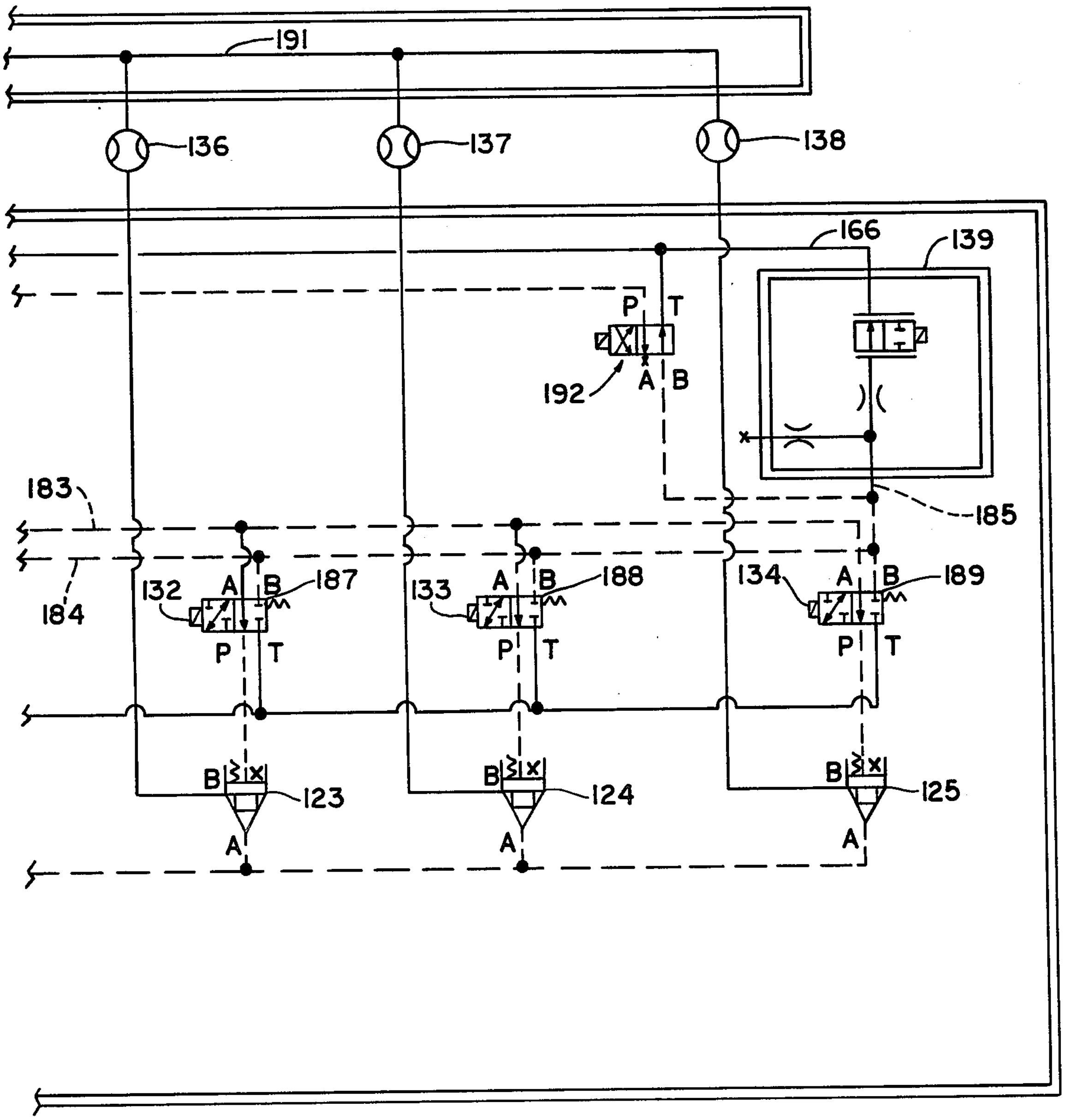

A detailed schematic of the manifold illustrated in block diagram in FIG. 4 is shown in FIG. 5 to which reference is hereby made. As is shown in FIG. 5 the manifold 98 is connected to the port 100 along with the sources 106 and 108 of hydraulic fluid under pressure. As shown the sources 1 and 2 may be of different pressures and different flow rates to provide a range of pressures and flow rates for application to the various devices which may be put under test using the test station of the present invention.

The manifold 98 contains a plurality of poppet valves 119 through 126 each of which functions in a manner to be described in detail below. The unit also includes a plurality of directional control valves including solenoids 128 through 135 the functions of which will be described more in detail below.

The unit also includes a pair of pressure control means 139 and 140/141 which regulate the hydraulic pressure downstream therefrom for purposes to be described more fully below.

An additional source of fluid under pressure 99 is also connected to the manifold 98 for purposes of providing a pilot signal for utilization in operation of the various poppets 119 through 126. For purposes of better understanding the following description and to clarify the illustration all portions of the schematic connected to return 116 are shown in solid lines. Any portions of the schematic of FIG. 5 which are connected to hydraulic pressure whether it be from the sources 1 and 2 or from the pilot are shown in dashed lines.

The poppets 119 through 126 are constructed in such a manner that unless pilot pressure 99 is applied to the port designated X the poppet is open. When a particular poppet is open, flow therethrough is from port A to port B or alternatively from port B to port A. Each of the directional control valves is constructed in such a way that the flow therethrough is in the direction indicated by the arrow and in each instance the valve is shown in its neutral or non-activated position. In addition, the valves and poppets may be biased by a spring means shown generally by the "M" shaped symbol adjacent the port X on the poppets or at one or both ends of the valves.

THE PORT AS A PRESSURE SOURCE

As will be noted, pilot pressure from source 99 is applied through the conduits 160 and 161 to the terminal P of the directional control valve 162. The valve 162 is in its neutral position and connects port P to ports A and B simultaneously so that pilot pressure is applied to conduits 163 and 164 causing the poppets 119 and 120 to be normally closed. Under these circumstances, no fluid flows from either source 1 which is connected to poppet 119 or source 2 which is connected to poppet 120 throughout the remainder of the system. Assuming for purposes of discussion that the device under test which is connected to the port 100 requires a hydraulic fluid source within the pressure and flow range of that designated by source 1, then a signal from the control apparatus is applied to solenoid 128 on the directional control valve 162 causing the control valve to move to the right as viewed in FIG. 5. When the valve has moved to the right, port A is connected to port T which is in turn connected by the conduits 165, 166 and 167 to the return 116. Port P is connected to port B thus maintaining pilot 99 pressure on the poppet 120 causing it to remain in a closed position. Since return is now connected to the port X of the poppet 119, the poppet opens permitting fluid to flow from source 1 through the conduit 168, from port B to port A of the poppet 119, through the conduit 169 to the conduit 170 which is connected to the port A of a reducing valve 141. The reducing valve 141 controls the downstream pressure appearing on the conduit 172 connected to port B of the reducing valve 141. The reducing valve pressure is controlled by a servovalve 140 which is responsive to signals applied thereto to establish the desired pressure that will be required for the specific device under test. The servovale 140 is of the type well known in the art and provides an appropriate pressure control for the reducing valve responsive to electrical signals applied to the servovale. The conduit 172 is connected to port A of a flow control valve 173 which is of the type well known to the art and provides an appropriate flow rate of hydraulic fluid at the desired pressure through the conduit 174 which is connected to the port B of the flow control valve 173.

The conduit 174 is connected to the port B of the poppet 121 the port A of which is connected through the conduit 175 to the port 100. The conduit 175 is also connected by way of the conduit 176 to the port A of the poppet valve 126. It is noted that the terminal X of the poppet 121 is connected to return by way of the ports P and A of the valve 177. Thus, so long as the solenoid 153 of the valve 177 is not energized, the poppet 121 will stay in its normally open position applying hydraulic fluid under pressure to the port 100.

It will also be noted that the poppet 126 has its terminal X also connected to return through the valve 178 by way of the ports P and A thereof. As a result thereof, unless the poppet 126 is closed, the fluid under pressure from source 106 will be automatically dumped to return through the interconnection of the conduits 175 and 176. To prevent this, a signal is applied by the control means to the solenoid 156 of the valve 178 causing the port B thereof to be connected to the port P thus applying pilot 99 pressure by way of the conduit 179 to the port X of the poppet 126. When such occurs poppet 126 is closed thus precluding dumping of the pressure source 1 to return.

It will be recognized by those skilled in the art that if the device under test connected to the port 100 requires a different range of pressures and/or flows from the source of hydraulic fluid under pressure a different source may be chosen. For example, source 2 may be selected by energizing the solenoid 129 on the directional control valve 162 thus moving the valve toward the left as viewed in FIG. 5. In this position, pilot 99 pressure is connected from ports P and A of the valve 162 to the poppet 119 causing it to remain in its closed position and at the same time connecting return through the ports B and T to the poppet 120 allowing it to become open. Under these conditions, flow from source 2 through ports B-A of the poppet 120 and the conduit 180 to the port A of the reducing valve 141 is permitted. Otherwise the remainder of the manifold 98 functions as above described to apply hydraulic pressure to the port 100.

THE PORT AS A RETURN PORT

Under certain circumstances it is desirable for the port 100 to function as the return port for the device under test connected thereto. Under these circumstances it will be understood by those skilled in the art that another port of the test station is functioning as the supply pressure port and would also be connected to the unit under test. When such occurs a signal is supplied to the solenoid 153 of the directional control valve 177 causing it to move toward the right as shown in FIG. 5. Under these circumstances the port B thereof is connected to the port P thereof thus applying pilot hydraulic pressure from the source 99 to the poppet 121 closing it and preventing flow between the ports B and A thereof. Thus hydraulic pressure from sources 106 and 108 could not be applied to the port 100. At the same time the valve 178 would remain deenergized and in the position as illustrated thus keeping the poppet 126 open.

With the poppets 121 and 126 in the positions just discussed, hydraulic fluid will flow from the device under test through the port 100, through the conduit 175, through the conduit 176, from port A to B of the poppet 126, through the conduit 181, from the ports A and B of the normally open poppet 122, through the conduits 182, 166 and 167 to the return port 116.

Under some circumstances, as above referred to, it is important to measure the hydraulic fluid rate of flow from the device under test. To provide this capability the manifold constructed in accordance with the present invention includes the additional poppets 123, 124 and 125 along with the pressure control valve 139. In addition thereto, the flow meters 136, 137 and 138 are provided to measure the particular flow rate for each of these flow paths as is desired.

The poppets 123, 124 and 125 are normally closed since they have pilot 99 pressure applied thereto by way of the conduits 160 and 183. Although it is shown in dashed format, the conduit 184 is normally connected to return through the three-way valve 135 which normally stays in the position as illustrated in FIG. 5 thereby connecting the conduit 185 to the conduit 166.

When it is desired to measure a particular flow from a device under test connected to port 100 the solenoid 131 on the directional control valve 186 is energized thereby interconnecting port B with port P. Port B is connected by way of the conduits 160 and 183 to pilot 99 pressure which would then be applied to port X of the poppet 122 causing it to become closed to block flow therethrough. At the same time, one of the valves 187, 188 and 189 would be energized to open one of the poppets 123, 124 and 125 respectively thus permitting flow of fluid from the device under test through one of the flow meters 136, 137 and 138 depending upon the desired rate of flow. Typically the flow meters will be calibrated to provide flows which differ from each other by an order of magnitude. For example the flow meter 138 may measure flow in the range from 0.03 to 0.3 gallons per minute, the flow meter 137 0.3 to 3 gallons per minute and the flow meter 136 3 to 30 gallons per minute.

Assuming for example that the unit under test should have a return flow rate between 0.3 and 3 gallons per minute, an electrical signal would be applied to the solenoid 133 of the directional control valve 188 to cause it to move toward the right as viewed in FIG. 5. Under these circumstances the return 116 would be connected through the valve 135, the conduits 184 and 185, through ports B and P of the valve 188 to the terminal X of the poppet 124. Under these circumstances, poppet 124 would be open ,ermitting flow through ports A and B thereof. Since the remainder of the poppets 122, 123 and 125 are closed the flow would be from the port 100 through the poppet 126 and the poppet 124, the conduit 190 through the flow meter 137 and to return 116 by way of the conduit 191.

In actual practice, since there is no way of knowing for sure what the flow rate is from the unit under test, the control signal source 102 (FIG. 4) would first apply a signal to the solenoid 132 of the valve 187 which would open the poppet 123 and permit the return flow to pass through the flow meter 136. After the flow meter is operable and registered, a flow of fluid therethrough of less than three gallons per minute, the signal source would de-energize the solenoid 132 allowing the poppet 123 to close and at that time would energize the solenoid 133 of the valve 188 allowing the poppet 124 to open and function as above described.

In some instances, the return pressure from the unit under test is important as is the flow rate. Under these circumstances, the solenoid 135 on the directional control valve 192 is energized thus causing it to move toward the right as shown in FIG. 5. When such occurs, the return conduit 166 which is normally connected to the conduits 184 and 185 through the ports T and B of the valve 192 is removed and pilot pressure is applied to the conduits 185 and 184 by way of the ports P and B of the valve 192. As should be noted, the pilot pressure from the source 99 thereof is applied through a restriction orifice 157 which limits the flow therethrough. Simultaneously the pressure control valve 139 is activated and is set at a predetermined pressure which is equal to the pressure at which the device under test return flow should operate. The valve 139 functions as a relief valve under these circumstances. As will be noted, return conduit 166 is connected to one side of the valve 139 while pilot pressure is applied to the other side thereof through the conduit 185. As a result, when the pilot pressure through orifice 157 exceeds the amount set by the valve 139, it opens venting the line 185 to return through the conduit 166. Thus the pressure at the conduits 185 and 184 remain constant at the level established by the setting of the pressure control valve 139. As a result thereof, that pressure is applied to the terminal X of one of the poppets 122 through 125 which is activated to permit the return flow therethrough. Thus, if only the return flow pressure is of concern and not the rate of flow, the thus established desired return pressure level is applied to the terminal X of the poppet 122 with the remaining poppets 123, 124, and 125 remaining closed. Under these circumstances, flow would occur from the device under test through the poppet 122 and to return as above described only when the return pressure is equal to or greater than that established on the conduit 184.

If, on the other hand, the flow rate was also important, the valve, for example 186 and 187, would be energized closing the poppet 122 and opening the poppet 123 and applying the pressure on the conduit 184 to the terminal X of the poppet 123 thus permitting functioning of the poppet 123 as immediately above described with respect to poppet 122.

If such is desired, additional flow meters may be provided with additional hydraulic switching to accommodate them to establish any level of flow rate desired.

Under some circumstances, it is desired to apply a single high pressure source for static tests to the device under pressure. Under such circumstances, a separate valve may be utilized as is shown at 130 in FIG. 5. Such a valve will have an additional high pressure hydraulic fluid source 200 connected thereto and upon energization of the valve 130, that source 200 would be connected from ports 1 and 3 directly to the port 100. Under these circumstances, the poppets 121 and 126 would be closed by the application of pilot pressure to the terminals X thereof by applying an appropriate signal to the solenoids 153 and 156 as above described. Under these circumstances, static pressure testing would be applied to the device under test attached to the port 100.

Under some circumstances, it is desired to provide a self-testing feature to the manifold to be sure that all parts thereof are operable in advance of connecting a device for testing to the port 100. Under those circumstances, the valves 192 and 139 would be activated to provide a predetermined pressure and flow rate in a manner above described to the various poppets and valves 122 through 125 and 186 through 189. At the same time, the valve 130 would be energized in such a way as to interconnect ports 2 and 3 thereof which would cause flow to occur from the pilot source 99 and a restriction orifice 158 to the conduits 176 and 181. The restriction orifice 158 would reduce the flow to approximately 0.3 gallons per minute and the pressure so that it would be from approximately 50 psi to pilot pressure. Under these circumstances, the various valves and poppets could be activated and deactivated responsive to appropriate signals to ascertain whether or not they were properly functioning. Subsequent thereto, the valve 130 would be returned to the position shown in FIG. 5, the appropriate device to be tested connected to the port 100, and the tests run in accordance with the particular device and the tests to be performed with regard thereto and in accordance with the tests available within the electronic on-line system.

It will be appreciated that the manifold as above described may be programmed so that the particular port 100 is caused to function as a pressure port or as a return port as desired in accordance with any particular application. In addition thereto, the port 100, whether it be functioning as a pressure port or a return port, may be caused to supply or respond to a particular pressure or flow rate as may be desired depending upon the device under test which is to be affixed thereto. Each of the plurality of ports at the universal test station constructed in accordance with the present invention will have associated therewith a manifold as illustrated in FIG. 5. Each of these manifolds may be independently constructed or the entire group of manifolds may be embodied in a single housing which is placed within the main console and attached to the individual ports. As will be understood by those skilled in the art, the main console may include any number of ports desired and even though nine are shown in FIG. 2, such is to be taken as an arbitrary number and thus not a limitation upon the scope of the present invention.

What is claimed is:

1. A general purpose hydraulic test station for testing hydraulic devices comprising:

(A) a housing defining a plurality of hydraulic ports;

(B) a source of hydraulic fluid under pressure;

(C) a hydraulic return; and (D) manifold means connected to at least one of said ports and including:

(1) first valve means, (2) means interconnecting said first valve means with said one port and with said source and with said return, and (3) control means for energizing said first valve means to selectively connect one only of said source and said return to said at least one port at any one time.

2. A hydraulic test station as defined in claim 1 which further includes pressure reducing means connected in the flow path between said source and said at least one port for controlling the fluid pressure level at said at least one port.

3. A hydraulic test station as defined in claim 2 which further includes second valve means for energizing said pressure reducing means responsive to a signal from said control means.

4. A hydraulic test station as defined in claim 1 which further includes flow control means connected in the flow path between said source and said at least one port for controlling the rate of flow of fluid to said at least one port.

5. A hydraulic test station as defined in claim 4 which further includes third valve means for energizing said flow control means responsive to a signal from said control means.

6. A hydraulic test station as defined in claim 1 which further includes a separate source of hydraulic fluid under pressure, said separate source having a higher pressure than said source, and fifth valve means for connecting said separate source to said at least one port through said manifold while by passing the remainder of said test station responsive to a signal from said control means.

7. A hydraulic test station as defined in claim 1 which further includes flow sensing means for measuring the flow of hydraulic fluid and sixth valve means for connecting said flow sensing means between said at least one port and said return responsive to a signal from said control means.

8. A hydraulic test station as defined in claim 7 wherein said flow sensing means includes a plurality of flow meters each having a different flow rate range which it can sense.

9. A hydraulic test station as defined in claim 8 wherein said sixth valve means includes a separate poppet valve for each flow meter and means for activating one of said separate poppet valves at a time to interconnect one of said flow meters at a time between said at least one port and said return.

10. A hydraulic test station as described in claim 1 which further includes variable pressure control means and seventh valve means for connecting said variable pressure control means between said at least one port and said return for pressure biasing said return by an amount equal to the pressure from said variable pressure control means.

11. A hydraulic test station as defined in claim 10 wherein said seventh valve means includes a further poppet valve connected between said at least one port and said return, said variable pressure control means being connected to said further poppet valve.

12. A hydraulic test station as described in claim 11 which further includes eighth valve means for activating said variable pressure control means responsive to a signal from said control means.

13. A hydraulic test station as described in claim 12 which further includes flow sensing means for measuring the flow of hydraulic fluid from said one port to said return.

14. A hydraulic test station as described in claim 13 wherein said flow sensing means includes a plurality of flow meters each having a different flow rate range which it can sense.

15. A hydraulic test station as described in claim 14 wherein said seventh valve means includes a separate poppet valve for each of said flow meters, and means for connecting said variable pressure control means to each said separate poppet valves.

16. A hydraulic test station as described in claim 15 which further includes ninth valve means for selectively activating one of said poppet valves at a time for activating one of said separate flow meters at a time.

17. A general purpose hydraulic test station for testing hydraulic devices comprising:

(A) a housing defining a plurality of hydraulic ports;

(B) first and second sources of hydraulic fluid under pressure, each of said first and second sources having a different pressure and a different flow rate;

(C) a hydraulic return; and (D) manifold means connected to at least one of said ports and including:

(1) first valve means, (2) means interconnecting said first valve means with said one port and with said first and second sources and said return, and (3) control means for energizing said first valve means to selectively connect one only of said first source and said second source and said return to said one port.

18. A hydraulic test station as defined in claim 17 which further includes selector means for connecting one of said two different sources to said at least one port in response to a signal from said control means.

19. A hydraulic test station as defined in claim 18 wherein said selector means includes fourth valve means having a directional control valve and a pair of poppet valves, said directional control valve receiving said signal and in response thereto selectively opening one of said poppet valves to allow flow from said one of said two sources.

20. A general purpose hydraulic test station for testing hydraulic devices comprising:

(A) a housing defining a plurality of hydraulic ports;

(B) a source of hydraulic fluid under pressure;

(C) a hydraulic return; and (D) separate manifold means connected to each of said ports, each of said manifold means including:

(1) separate valve means, (2) means interconnecting said separate valve means in each manifold means with said respective port to which said manifold is connected and with said source and said return, and (3) control means for energizing said separate valve means to selectively connect one of said source and said return to said respective port.

21. A hydraulic test station as described in claim 20 wherein all of said manifold means are secured together to form a module contained within said housing.

22. A general purpose hydraulic test station for testing hydraulic devices comprising:

(A) a housing defining a plurality of hydraulic ports;

(B) a source of hydraulic fluid under pressure;

(C) a hydraulic return;

(D) manifold means connected to at least one of said ports and including:

(1) first valve means, (2) means interconnecting said first valve means with said one port and with said source and said return, and (3) control means for energizing said first valve means to selectively connect one of said source and return to said one port;

(E) separate support means for receiving a hydraulic device to be tested; and (F) means for moving said support means adjacent to and remote from said housing.

23. A hydraulic test station as described in claim 22 which further includes conduit means for interconnecting said device and at least two of said ports.

* * * * *